US009606898B2

(12) United States Patent
Baek et al.

(10) Patent No.: US 9,606,898 B2
(45) Date of Patent: Mar. 28, 2017

(54) COMPUTING APPARATUS AND METHOD FOR PROVIDING A USER APPLICATION TO BE EXECUTED IN A MEDIA PLAYBACK APPARATUS

(75) Inventors: Wonjang Baek, Seongnam-si (KR); John Kim, Seoul (KR); Doo Hwan Yi, Seoul (KR)

(73) Assignee: SK PLANET CO., LTD., Seoul (KR)

( * ) Notice: Subject to any disclaimer, the term of this patent is extended or adjusted under 35 U.S.C. 154(b) by 0 days.

(21) Appl. No.: 13/511,329

(22) PCT Filed: Nov. 26, 2010

(86) PCT No.: PCT/KR2010/008455
§ 371 (c)(1),
(2), (4) Date: May 22, 2012

(87) PCT Pub. No.: WO2011/065781
PCT Pub. Date: Jun. 3, 2011

(65) Prior Publication Data
US 2012/0230650 A1    Sep. 13, 2012

(30) Foreign Application Priority Data
Nov. 26, 2009   (KR) .................. 10-2009-0115289

(51) Int. Cl.
*H04N 9/80*       (2006.01)
*G06F 11/36*      (2006.01)
*G11B 27/36*      (2006.01)

(52) U.S. Cl.
CPC .......... *G06F 11/3668* (2013.01); *G11B 27/36* (2013.01); *G11B 2220/2541* (2013.01)

(58) Field of Classification Search
CPC ........ H04N 5/775; H04N 5/85; H04N 9/8042; G11B 27/34; G11B 27/105
USPC ......................................................... 386/248
See application file for complete search history.

(56) References Cited

U.S. PATENT DOCUMENTS

| 7,779,390 B1 | 8/2010 | Allavarpu et al. ............ 717/124 |
| 8,336,029 B1 * | 12/2012 | McFadden et al. ........... 717/124 |
| 2009/0103902 A1 * | 4/2009 | Matsuura et al. ............ 386/124 |
| 2009/0198484 A1 | 8/2009 | Christensen et al. .......... 703/22 |

(Continued)

FOREIGN PATENT DOCUMENTS

| CN | 1372661 A | 10/2002 |
| CN | 1542631 A | 11/2004 |

(Continued)

OTHER PUBLICATIONS

International Search Report filed in PCT/KR2010/008455.

(Continued)

*Primary Examiner* — William C Vaughn, Jr.
*Assistant Examiner* — Daniel Tekle
(74) *Attorney, Agent, or Firm* — Stein IP, LLC

(57) ABSTRACT

The present invention relates to a computing apparatus and to a method for providing a user application to be executed in a media playback apparatus. According to the present invention, the computing apparatus executes a developer application, and tests a user application in the media playback apparatus which is connected to the computer apparatus through a network. Thus, applications stored in a plurality of computing apparatuses can be tested using a single media playback apparatus.

14 Claims, 4 Drawing Sheets

(56) References Cited

U.S. PATENT DOCUMENTS

2009/0304367 A1    12/2009    Zhang et al. ................. 386/131

FOREIGN PATENT DOCUMENTS

| JP | 2007-219695 A | 8/2007 |
|----|---------------|--------|
| JP | 2008-123010 A | 5/2008 |
| KR | 1999-0040730 A | 6/1999 |
| KR | 2003-0027467 A | 4/2003 |
| KR | 10-2006-0085514 A | 7/2006 |
| KR | 10-2006-0101533 A | 9/2006 |
| KR | 10-2007-0100371 | 10/2007 |
| KR | 10-2008-0095528 A | 10/2008 |
| KR | 10-0898527 B1 | 5/2009 |
| WO | WO 2006/109263 A2 | 10/2006 |
| WO | WO 2007/111208 A1 | 10/2007 |
| WO | WO 2009/072806 A2 | 6/2009 |

OTHER PUBLICATIONS

Korean Office Action, issued Mar. 16, 2011, issued in corresponding Korean Application No. 10-2009-0115289.
Korean Notice of Allowance, issued Sep. 21, 2011, issued in corresponding Korean Application No. 10-2009-0115289.
International Search Report, issued Aug. 2, 2011, issued in corresponding International Application No. PCT/KR2010/008455.
Chinese Office Action, issued Mar. 21, 2014, issued to corresponding Chinese Application No. 201080049556.X.
Japanese Office Action, issued May 30, 2014, issued to corresponding Japanese Application No. 2012-541022.
Chinese Office Action dated Dec. 29, 2014, issued to Chinese Application No. 201080049556.X.
European Office Action with extended search report, issued by the European Patent Office dated Apr. 5, 2016 in corresponding application 10833593.6-1951/2506141.

* cited by examiner

COMPUTING APPARATUS AND METHOD FOR PROVIDING A USER APPLICATION TO BE EXECUTED IN A MEDIA PLAYBACK APPARATUS

CROSS-REFERENCE TO RELATED APPLICATIONS

This application claims the benefit of PCT International Patent Application No. PCT/KR2010/008455, filed Nov. 26, 2010, and Korean Patent Application No.10-2009-0115289, filed Nov. 26, 2009, in the Korean Intellectual Property Office, the disclosures of which are incorporated herein by reference.

BACKGROUND OF THE INVENTION

1. Field of the Invention

The present invention relates to a computing apparatus and a method for providing a user application executed in a media playback apparatus and, more particularly, to a computing apparatus and a method provided in a media playback apparatus to test a user application executed in the media playback apparatus.

2. Description of the Related Art

A Blu-ray disk (hereinafter referred to as "BD") provides various user applications executed in a Blu-ray disk player (hereinafter referred to as "BDP") as well as HD images through the BDP.

A user can be provided with a service by selecting a desired user application from various user applications stored in a BD and executing the selected user application. For example, when the user selects and executes a VOD application, a BDP provides a video selected by the user in real time by accessing a VOD server.

User applications executed in the BDP are generated by compiling a source code written in JAVA.

FIG. 1 illustrates a conventional user application development environment.

Referring to FIG. 1, a user generates a user application using application development software installed in a computing apparatus 10 such as a PC. Specifically, the user creates a source code using the application development software and generates the user application by compiling the source code using a compiler included in the application development software.

To test and debug the generated user application, the user stores the user application in a storage device 20 such as a BD. The user inserts the storage device 20 into a media playback apparatus 30 to execute the user application stored in the storage device 20.

The media playback apparatus 30 outputs a debugging message, a log message, etc., which are generated according to the user application, through a display device 40.

The user corrects and compiles the source code with reference to the debugging message and log message and repeats the above-mentioned procedure.

In the conventional user application development environment, it is necessary to store a corrected user application in the storage device 20 and test and debug the corrected user application whenever the source code is corrected.

Particularly, in order to test a user application executed in a media playback apparatus using a disk storage device such as BD, the disk storage device needs to include a recording device capable of recording the user application. This requires additional cost for constructing the application development environment. Furthermore, even when the disk storage device includes the recording device, the user has to repeat the operation of inserting the disk storage device in which the user application is stored into the media playback apparatus and testing and debugging the user application whenever the user application is corrected.

Moreover, the user needs to check a debugging message and a log message generated during the test and debugging operation through the display device. Accordingly, when a plurality of debugging messages and log messages are generated, some of the messages may not be checked, and the plurality of debugging messages and log messages cannot be stored.

To solve this problem, there has been proposed a method of installing media playback apparatus simulation software in a computing apparatus to test and debug a user application.

However, because the simulation software cannot construct the completely same test environment as that implemented by the physical media playback apparatus, an error is frequently generated when a user application is executed in the physical media playback apparatus even if the user application is executed without generating an error in a test environment using the simulation software.

SUMMARY OF THE INVENTION

An object of the present invention is to provide a computing apparatus and a method for providing a user application to be executed in a media playback apparatus, which execute a developer application and test a user application in the media playback apparatus which is connected to the computing apparatus through a network, such that applications stored in a plurality of computing apparatuses can be tested using a single media playback apparatus.

In accordance with one aspect of the present invention to achieve the object, a computing apparatus includes an application providing program; one or more user applications to be executed in a media playback apparatus; a storage device storing the application providing program and the user applications; a processor generating the user applications and executing the application providing program; and a communication unit communicating with the media playback apparatus under the control of the processor, wherein the application providing program includes a first instruction for transmitting information about the one or more user applications to the media playback apparatus in response to a user application information request received from the media playback apparatus through the communication unit; a second instruction for receiving a user application request for a user application, which is selected by the media playback apparatus from the one or more user applications, from the media playback apparatus through the communication unit; and a third instruction for transmitting the user application selected by the media playback apparatus to the media playback apparatus through the communication unit in response to the user application request.

The user applications may be written in JAVA.

The application providing program may further include a fourth instruction for receiving debugging information generated when the selected user application is executed from the media playback apparatus.

The application providing program may further include a fifth instruction for storing the debugging information in the storage device.

The application providing program may further include a sixth instruction for displaying the debugging information on a display device.

The application providing program may further include a seventh instruction for transmitting configuration information of the computing apparatus to the media playback apparatus in response to a configuration information request received from the media playback apparatus through the communication unit.

The media playback apparatus may include a Blu-ray disk player.

In accordance with another aspect of the present invention to achieve the object, a method for providing one or more user applications generated in a computing apparatus to a media playback apparatus includes (a) receiving a user application information request from the media playback apparatus; (b) transmitting information about the one or more user applications to the media playback apparatus in response to the user application information request; (c) receiving, from the media playback apparatus, a user application request for a user application selected by the media playback apparatus from the one or more user applications; and (d) transmitting the user application selected by the media playback apparatus to the media playback apparatus in response to the user application request.

The user applications may be written in JAVA.

The method may further include (e) receiving debugging information generated when the selected user application is executed from the media playback apparatus.

The method may further include (f) storing the debugging information in a storage device.

The method may further include (g) displaying the debugging information on a display device.

The method may further include (h) transmitting configuration information of the computing apparatus to the media playback apparatus in response to a configuration information request received from the media playback apparatus prior to (a).

The media playback apparatus may include a Blu-ray disk player.

The computing apparatus and method for providing a user application to be executed in a media playback apparatus according to the present invention has the following advantages.

Since a user application generated in a computing apparatus connected through a network is tested by executing the developer application, it is possible to test applications stored in a plurality of computing apparatuses using a single media playback apparatus. Accordingly, an additional recording device for storing a user application in a disk is not needed.

In addition, a user can select a user application displayed through a display device connected to the media playback apparatus according to the present invention and test the selected user application. Hence, the user can easily test the user application without repeating an operation of inserting a disk storage device storing the user application into the media playback apparatus and testing and debugging the user application whenever the user application is corrected.

Moreover, the user can easily check a debugging message generated during the test and debugging operation since the debugging message is stored in the computing apparatus or a logging server.

Furthermore, it is possible to easily test a user application without using media playback apparatus simulation software.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
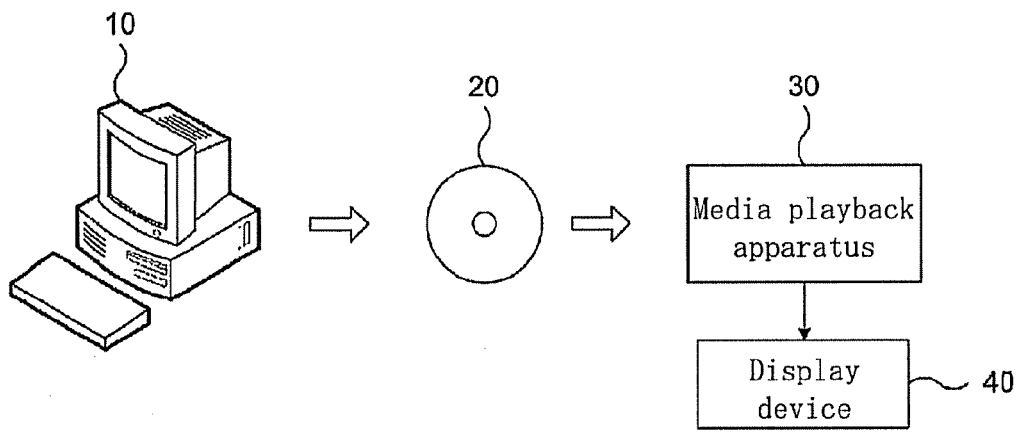
FIG. 1 illustrates a conventional user application development environment.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

A computing apparatus and a method for providing a user application to be executed in a media playback apparatus according to an embodiment of the present invention will be described in detail with reference to the attached drawings.

Figure 2:
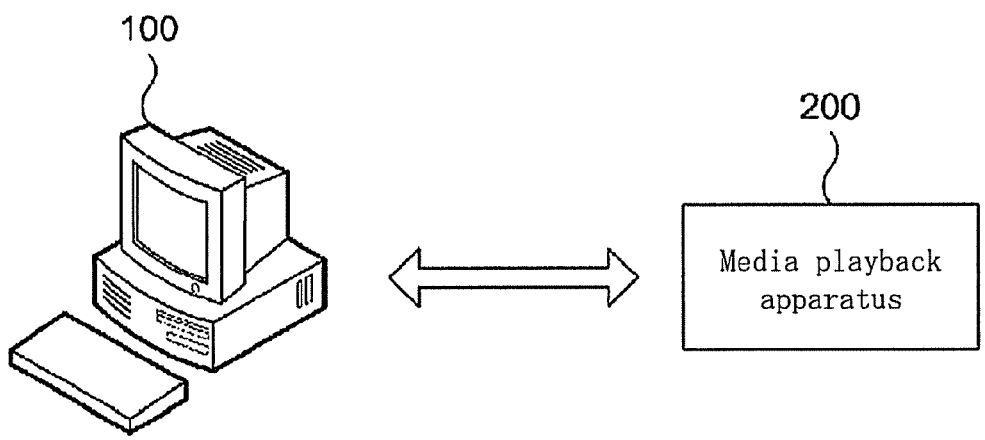
FIG. 2 illustrates a user application development environment according to the present invention.

FIG. 2 illustrates a user application development environment according to the present invention.

Referring to FIG. 2, the user application development environment according to the present invention includes a computing apparatus 100 and a media playback apparatus 200. Application development software used to develop a user application to be executed in the media playback apparatus 200 is installed in the computing apparatus 100.

The media playback apparatus 200 preferably includes a BDP and can execute JAVA based user applications. The media playback apparatus 200 can read and execute a developer application for implementing the present invention. In the following description, the media playback apparatus denotes an apparatus capable of reproducing audio/video data stored in various storage devices such as a BD, a DBD, a flash memory, a hard disk, etc. and executing user applications.

Upon execution of the developer application, the media playback apparatus 200 can communicate with the computing apparatus 100 to transmit a configuration information request, a user application information request, a user application request, and debugging information to the computing apparatus 100 and receive a user application from the computing apparatus 100.

The computing apparatus 100 will now be described in more detail.

Figure 3:
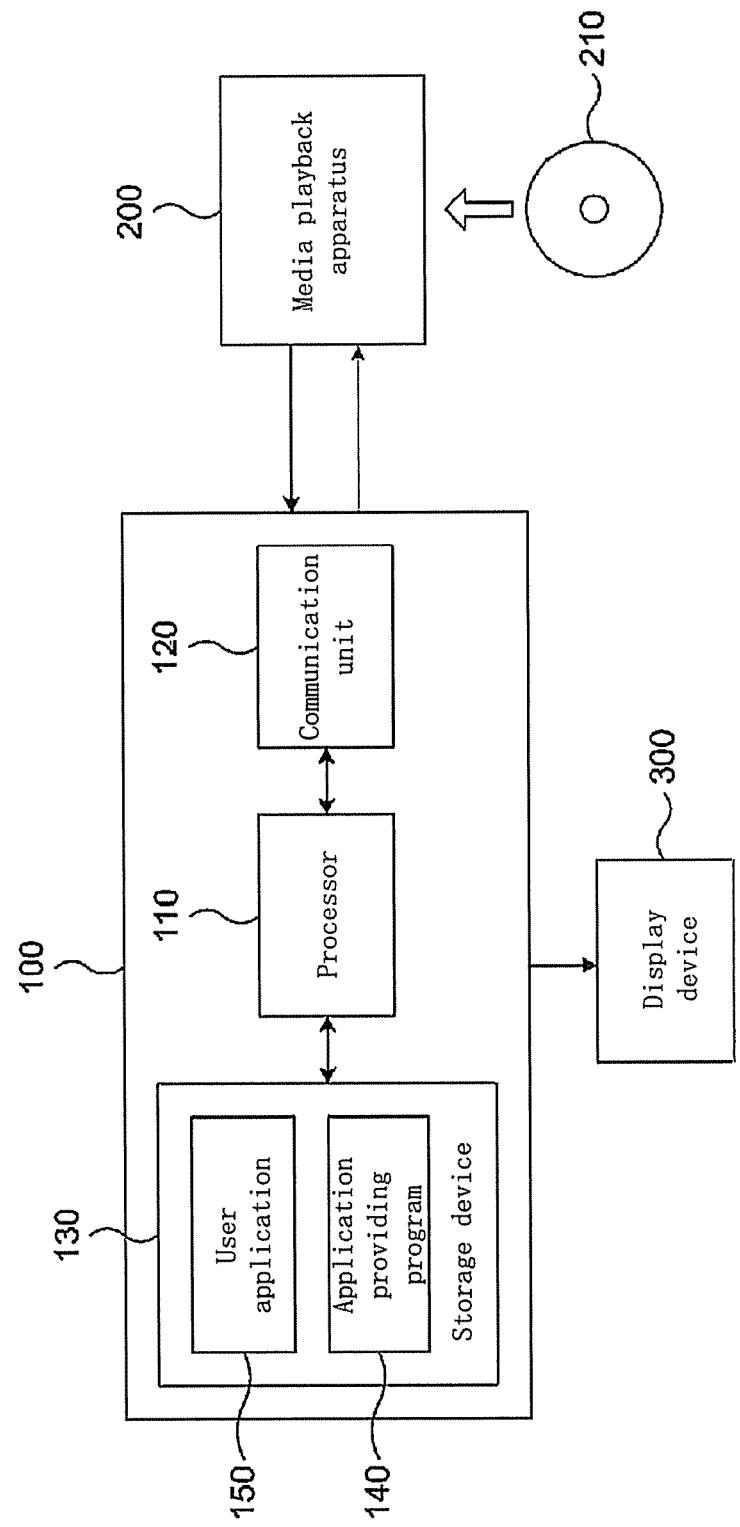
FIG. 3 is a block diagram of a computing apparatus according to the present invention.

FIG. 3 is a block diagram of the computing apparatus 100 according to the present invention.

Referring to FIG. 3, the computing apparatus 100 according to the present invention includes one or more user applications 150, a storage device 130, a processor 110, a communication unit 120, and an application providing program 140.

The one or more user applications 150 are software executed in the media playback apparatus 200. The one or more user applications 150 can include a VOD application, a word processor application, a game application, etc. It is possible to generate the user applications 150 by compiling a JAVA source code created using the application development software.

The storage device 130 stores the application providing program 140 and the user applications 150. The storage device 130 may be a BD, a hard disk, a flash memory, a RAM, a ROM, or a USB storage device, but it is not limited thereto.

The processor 110 generates the user applications 150 and executes the application providing program 140. The processor 110 is a Central Processing Unit (CPU) and controls the overall operation of the computing apparatus 100. In addition, the processor 110 compiles a source code created using the application development software through a compiler and stores the generated user applications 150 in the storage device 130.

The communication unit 120 communicates with the media playback apparatus 200 under the control of the processor 110. The communication unit 120 may be the Ethernet that supports a LAN.

The application providing program 140 is executed by the processor 110 and includes one or more instructions. The processor 110 executes the one or more instructions included in the application providing program 140.

A description will be given of an embodiment of the application providing program 140 according to the present invention.

Figure 4:
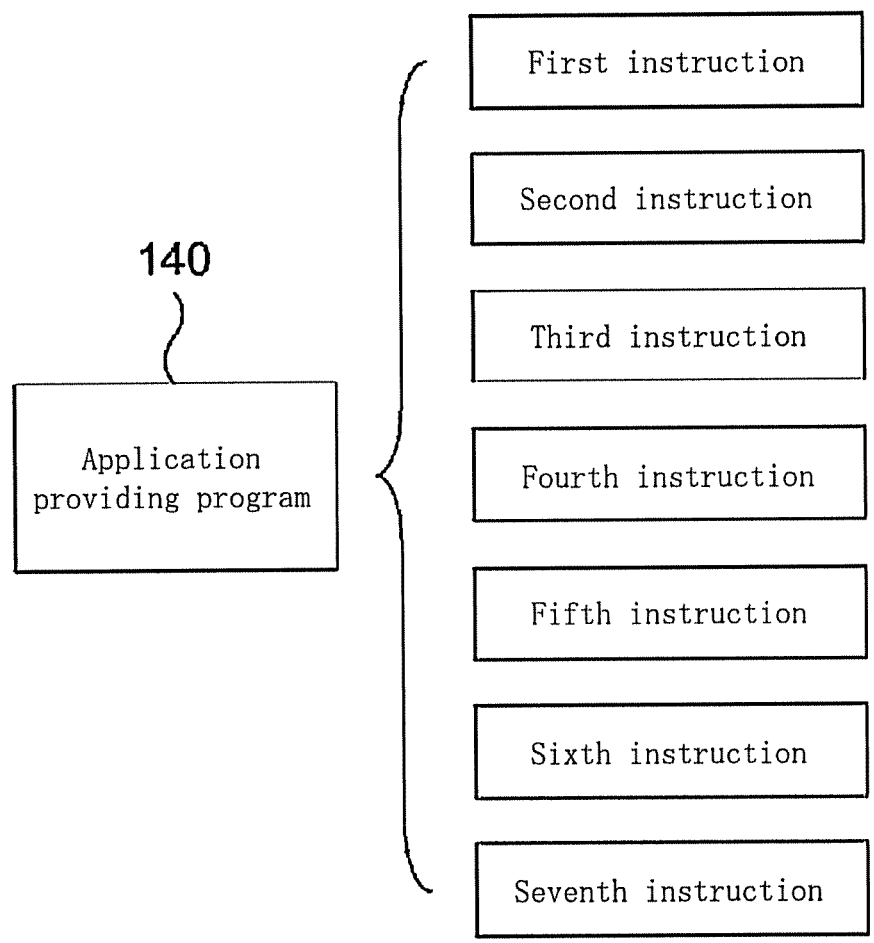
FIG. 4 illustrates an application providing program of the computing apparatus according to the present invention.

FIG. 4 illustrates the configuration of the application providing program 140 of the computing apparatus according to the present invention.

Referring to FIG. 4, the application providing program 140 of the computing apparatus according to the present invention includes first to seventh instructions. The fourth to seventh instructions are optional and they may be included in the application providing program 140 or not. The application providing program 140 may be plug-in of the application development software.

The processor 110 transmits information about the one or more user applications 150 to the media playback apparatus 200 in response to a user application information request, which is received from the media playback apparatus 200 through the communication unit 120, according to the first instruction. The information about the one or more user applications 150 includes the titles of the user applications 150 stored in the storage device 130.

Prior to executing the first instruction, the processor 110 can transmit configuration information of the computing apparatus 100 to the media playback apparatus 200 in response to a configuration information request, which is received from the media playback apparatus 200 through the communication unit 120, according to the seventh instruction. The configuration information may include the IP address and the name of the computing apparatus 100.

Upon reception of the information about the one or more user applications 150, the media playback apparatus 200 selects one of the one or more user applications 150.

The processor 110 receives a user application request for the user application 150, selected by the media playback apparatus 200 from the one or more user applications 150, from the media playback apparatus 200 through the communication unit 120 according to the second instruction.

The processor 110 transmits the user application 150 selected by the media playback apparatus 200 to the media playback apparatus 200 through the communication unit 120 according to the third instruction.

Upon reception of the selected user application 150, the media playback apparatus 200 executes the selected user application 150. When the selected user application 150 is executed, debugging information is generated.

The processor 110 receives the debugging information, generated when the media playback apparatus 200 executes the selected user application 150, from the media playback apparatus 200 according to the fourth instruction.

The processor 110 stores the received debugging instruction in the storage device 130 according to the fifth instruction.

The processor 110 displays the debugging information through the display device 300 according to the sixth instruction.

A method for providing a user application according to an embodiment of the present invention will now be described in detail.

Figure 5:
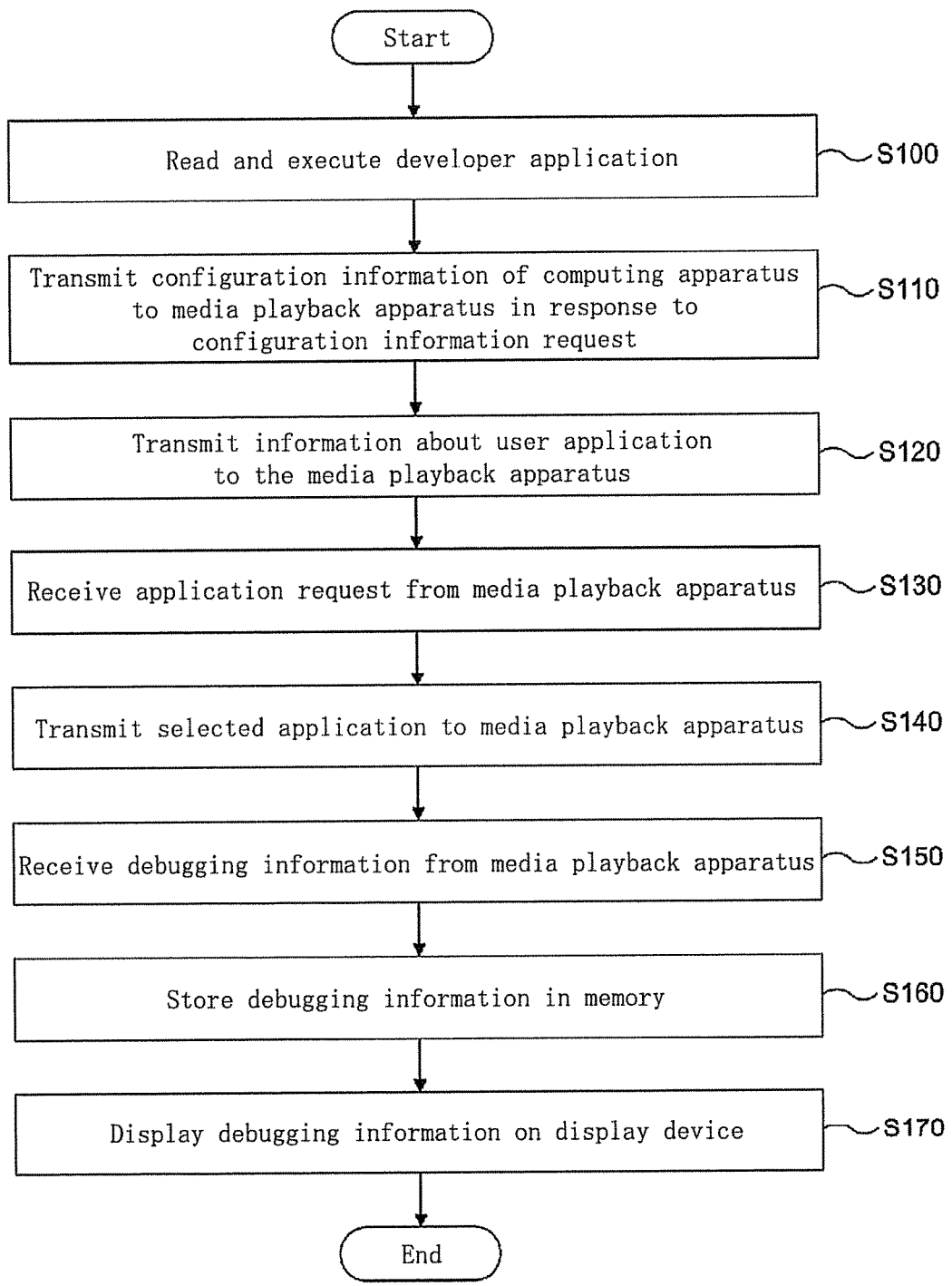
FIG. 5 is a flowchart illustrating a method for providing a user application according to the present invention.

FIG. 5 is a flowchart illustrating a method for providing a user application according to the present invention.

Referring to FIG. 5, a media playback apparatus reads and executes a developer application stored in a storage device, and a computing apparatus reads and executes an application providing program (S100). It is noted that the media playback apparatus operates according to instructions included in the developer application and the computing apparatus operates according to instructions included in the application providing program stored in the storage device. Therefore, steps of the user application providing method according to the present invention are performed by the media playback apparatus or the computing apparatus according to the instructions included in the developer application or the instructions included in the application providing program.

Configuration information of the computing apparatus is transmitted to the media playback apparatus in response to a configuration information request received from the media playback apparatus (S110).

Subsequently, information about one or more user applications is transmitted to the media playback apparatus in response to a user application information request received from the media playback apparatus (S120).

Upon reception of the information about one or more user applications, the media playback apparatus selects one of the user applications.

A user application request for the user application, selected by the media playback apparatus from the one or more user applications, is received from the media playback apparatus (S130).

The user application selected by the media playback apparatus is transmitted to the media playback apparatus in response to the user application request (S140).

The media playback apparatus executes the received user application. When the selected user application is executed, debugging information is generated.

The debugging information is received from the media playback apparatus (S150).

Then, the received debugging information is stored in the storage device (S160).

The debugging information is displayed through a display device (S170). A user can correct a source code with reference to the debugging information.

Those skilled in the art will appreciate that the present invention may be embodied in other specific forms than those set forth herein without departing from the spirit and essential characteristics of the present invention. The above description is therefore to be construed in all aspects as illustrative and not restrictive.

The scope of the invention should be determined by reasonable interpretation of the appended claims and all changes coming within the equivalency range of the invention are intended to be within the scope of the invention.

Although a few embodiments of the present invention have been shown and described, it would be appreciated by those skilled in the art that changes may be made in this embodiment without departing from the principles and spirit of the invention, the scope of which is defined in the claims and their equivalents.

The invention claimed is:

1. A computing apparatus comprising:
a storage device storing an application providing program, a plurality of user applications to be executed and tested in a media playback apparatus and an executable instruction for generating one or more user applications;
a processor generating the plurality of user applications and executing the application providing program; and
a communication unit communicating with the media playback apparatus under the control of the processor,
wherein the application providing program comprises:
a first instruction for transmitting information about the plurality of user applications to the media playback apparatus in response to a user application information request received from the media playback apparatus through the communication unit;
a second instruction for receiving a user application request for a specific user application, which is selected by the media playback apparatus from the plurality of user applications, from the media playback apparatus through the communication unit;
a third instruction for transmitting the specific user application selected by the media playback apparatus to the media playback apparatus for requesting debugging information related to the selected user application through the communication unit in response to the user application request;
a fourth instruction for receiving debugging information from the media playback apparatus, the debugging information being generated by the media playback apparatus when the selected specific user application is executed and tested at the media playback apparatus;
wherein the application providing program further comprises:
a seventh instruction, which is executed before the first instruction, for transmitting configuration information of the computing apparatus to the media playback apparatus in response to a configuration information request received from the media playback apparatus through the communication unit;
an instruction for correcting a source code with reference to the debugging information; and
an instruction for generating the user application when the corrected source code is compiled.

2. The computing apparatus of claim 1, wherein the user applications are written in JAVA.

3. The computing apparatus of claim 1, wherein the application providing program further comprises a fifth instruction for storing the debugging information in the storage device.

4. The computing apparatus of claim 1, wherein the application providing program further comprises a sixth instruction for displaying the debugging information on a display device.

5. The computing apparatus of claim 1, wherein the media playback apparatus includes a Blu-ray disk player.

6. A method for providing a plurality of user applications generated in a computing apparatus to a media playback apparatus, comprising:
(a) receiving a user application information request from the media playback apparatus;
(b) transmitting information about the plurality of user applications to the media playback apparatus in response to the user application information request;
(c) receiving, from the media playback apparatus, a user application request for a specific user application selected by the media playback apparatus from the plurality of user applications;
(d) transmitting the specific user application selected by the media playback apparatus to the media playback apparatus for requesting debugging information related to the selected user application in response to the user application request;
(e) receiving debugging information from the media playback apparatus, the debugging information being generated by the media playback apparatus when the selected specific user application is executed and tested at the media playback apparatus and an executable instruction for generating one or more user applications;
wherein the method further comprises:
(h) before steps (a) and (b), transmitting configuration information of the computing apparatus to the media playback apparatus in response to a configuration information request received from the media playback apparatus;
(i) after step (e), correcting a source code with reference to the debugging information; and
(j) after step (e), generating the user application when the corrected source code is compiled.

7. The method of claim 6, wherein the user applications are written in JAVA.

8. The method of claim 6, further comprising (f) storing the debugging information in a storage device.

9. The method of claim 6, further comprising (g) displaying the debugging information on a display device.

10. The method of claim 6, wherein the media playback apparatus includes a Blu-ray disk player.

11. A non-transitory computer-readable medium having an application providing program of a computing apparatus for providing a user application to be executed and tested in a media playback apparatus, comprises:
a first instruction for transmitting information about a plurality of user applications to the media playback apparatus in response to a user application information request received from the media playback apparatus;
a second instruction for receiving a user application request for a specific user application, which is selected by the media playback apparatus from the plurality of user applications, from the media playback apparatus;
a third instruction for transmitting the specific user application selected by the media playback apparatus to the media playback apparatus for requesting debugging information related to the selected user application in response to the user application request;
a fourth instruction for receiving debugging information from the media playback apparatus, the debugging information being generated by the media playback apparatus when the selected specific user application is executed and tested at the media playback apparatus and an executable instruction for generating one or more user applications;

wherein the application providing program further comprises:
a seventh instruction, which is executed before the first instruction, for transmitting configuration information of the computing apparatus to the media playback apparatus in response to a configuration information request received from the media playback apparatus;
an instruction for correcting a source code with reference to the debugging information; and
an instruction for generating the user application when the corrected source code is compiled.

12. The non-transitory computer-readable medium having the application providing program of claim 11, further comprises a fifth instruction for storing the debugging information in the computing apparatus.

13. The non-transitory computer-readable medium having the application providing program of claim 11, further comprises a sixth instruction for displaying the debugging information on the computing apparatus.

14. The non-transitory computer-readable medium having the application providing program of claim 11, wherein the configuration information of the computing apparatus includes an IP address and a name of the computing apparatus.

* * * * *